United States Patent
Hashimoto et al.

(10) Patent No.: US 10,019,919 B2
(45) Date of Patent: Jul. 10, 2018

(54) PROCESSING APPARATUS, COMMAND GENERATION METHOD AND STORAGE MEDIUM

(71) Applicant: CANON KABUSHIKI KAISHA, Tokyo (JP)

(72) Inventors: Takayuki Hashimoto, Kawasaki (JP); Katsuyuki Kobayashi, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 33 days.

(21) Appl. No.: 14/695,399

(22) Filed: Apr. 24, 2015

(65) Prior Publication Data

US 2015/0324026 A1    Nov. 12, 2015

(30) Foreign Application Priority Data

May 8, 2014  (JP) ................. 2014-097111

(51) Int. Cl.
*G06F 3/045* (2006.01)
*G09G 3/00* (2006.01)
(Continued)

(52) U.S. Cl.
CPC ........... *G09G 3/002* (2013.01); *G06F 3/0421* (2013.01); *G06F 3/0488* (2013.01);
(Continued)

(58) Field of Classification Search
CPC .. G06F 3/0425; G06F 3/0428; G06F 3/04883; G06F 2203/04109; G06F 2203/04808
See application file for complete search history.

(56) References Cited

U.S. PATENT DOCUMENTS

2006/0001650 A1*  1/2006  Robbins .............. G06F 3/04845
                                                       345/173
2011/0145759 A1*  6/2011  Leffert ................ G06F 3/04845
                                                       715/800
(Continued)

FOREIGN PATENT DOCUMENTS

JP     2007-279638 A    10/2007
JP     2012-068892 A    4/2012
(Continued)

OTHER PUBLICATIONS

Japanese Office Action for corresponding Application No. JP2014097111 dated Jan. 19, 2018, with English Translation (3 pages).

*Primary Examiner* — Nelson Rosario
(74) *Attorney, Agent, or Firm* — Carter, Deluca, Farrell & Schmidt, LLP

(57) ABSTRACT

A processing apparatus generates a command in accordance with a size of the coordinate input area and a distance between two touch inputs on the coordinate input area. When a distance between two touch inputs on a first coordinate input area larger than a second coordinate input area changes to a first distance, a command corresponding to a second distance longer than the first distance is generated. When a distance between two touch inputs on the second coordinate input area smaller than the first coordinate input area changes to a third distance, a command corresponding to the third distance is generated.

11 Claims, 12 Drawing Sheets

(51) Int. Cl.
 *G06F 3/0488* (2013.01)
 *G06F 3/042* (2006.01)
 *G06F 3/0484* (2013.01)

(52) U.S. Cl.
 CPC ...... *G06F 3/04845* (2013.01); *G06F 3/04883* (2013.01); *G06F 2203/04806* (2013.01); *G09G 2354/00* (2013.01)

(56) References Cited

U.S. PATENT DOCUMENTS

| | | | |
|---|---|---|---|
| 2013/0106908 A1* | 5/2013 | Ichieda | G06F 3/0425 345/629 |
| 2013/0191768 A1* | 7/2013 | Thompson | G06F 3/04883 715/765 |
| 2014/0059481 A1* | 2/2014 | Lee | G06F 3/0488 715/784 |
| 2014/0129990 A1* | 5/2014 | Xin | G06F 3/04845 715/849 |
| 2016/0334975 A1* | 11/2016 | Takeuchi | G06F 3/0425 |

FOREIGN PATENT DOCUMENTS

| | | |
|---|---|---|
| JP | 2012-137837 A | 7/2012 |
| JP | 2013-210950 A | 10/2013 |

\* cited by examiner

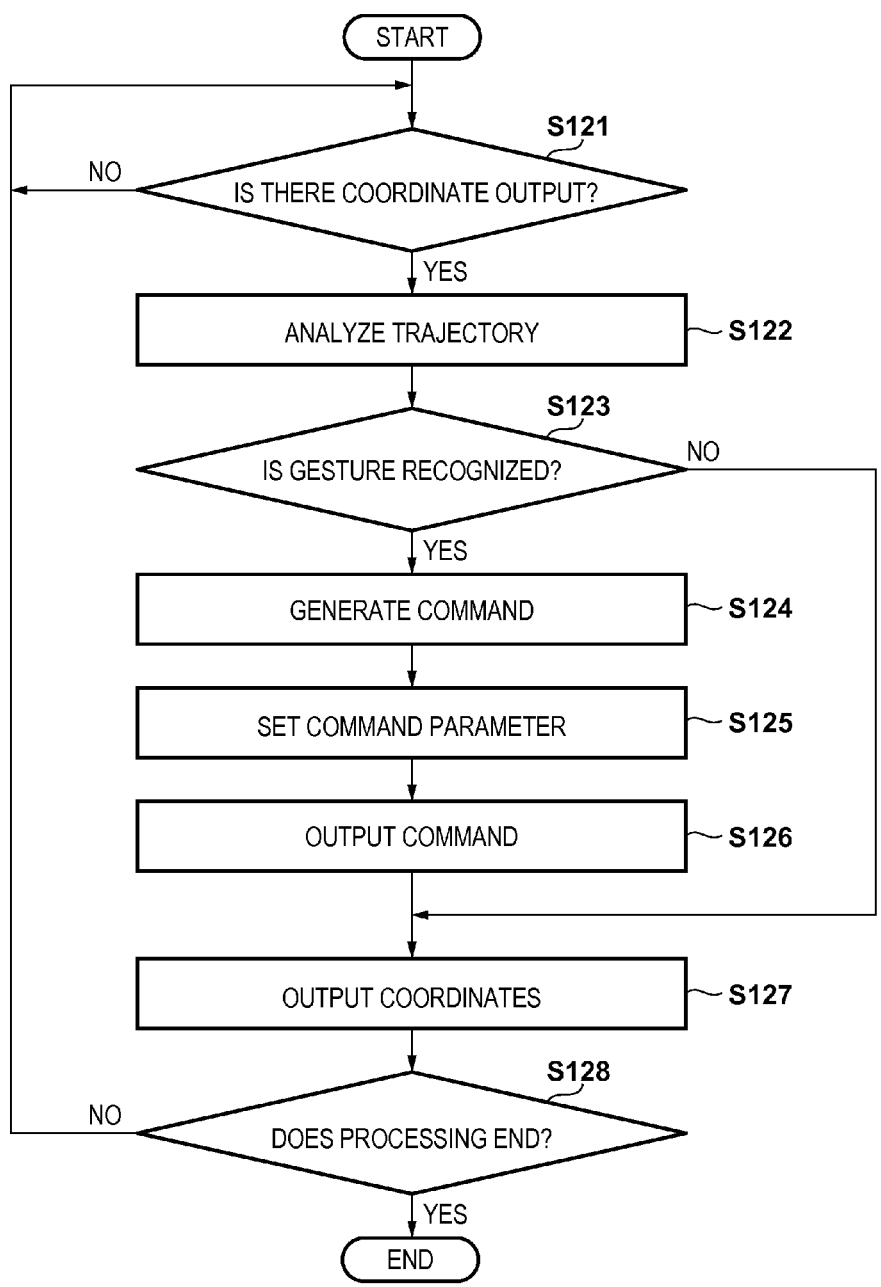

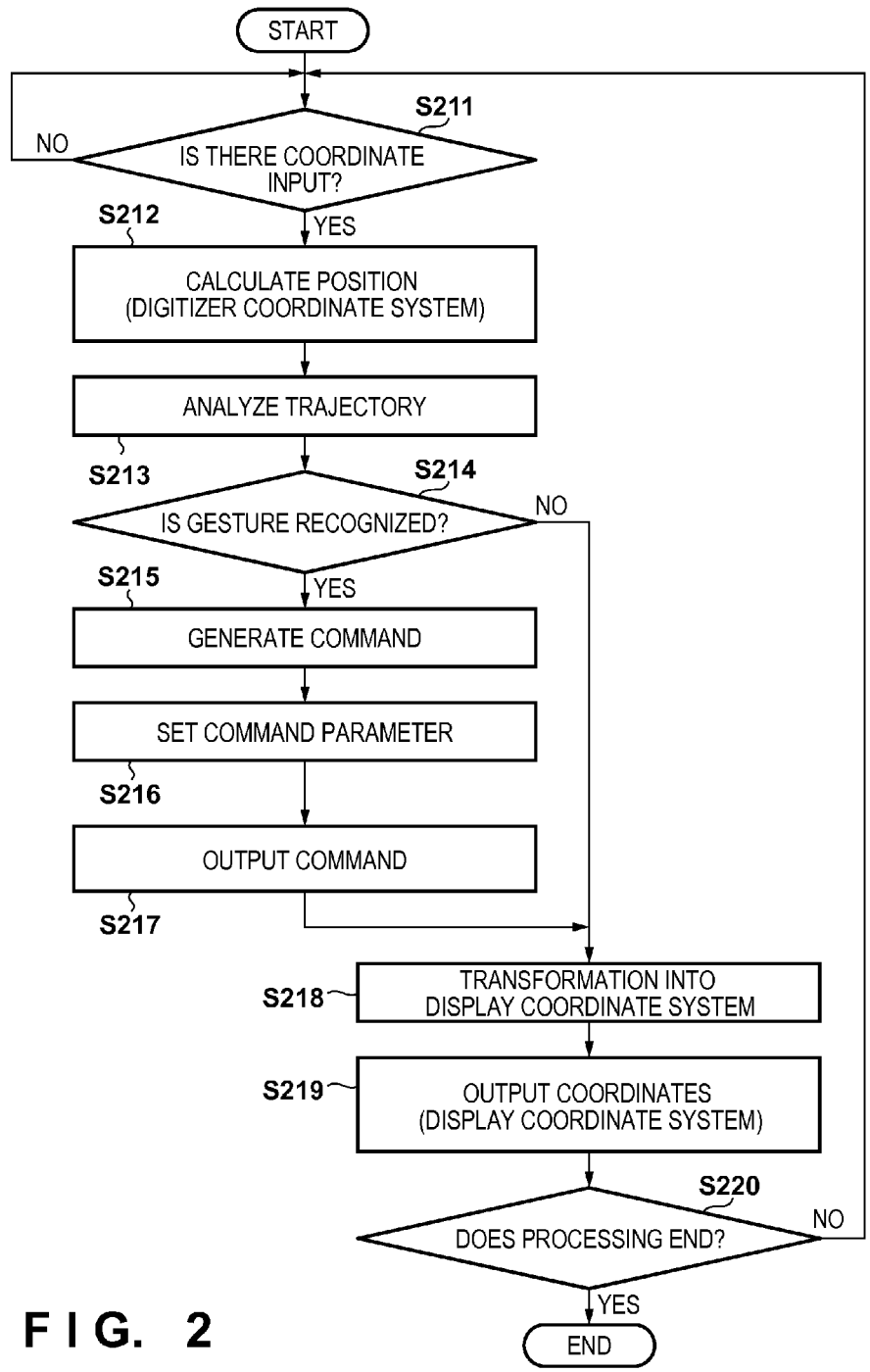
F I G. 2

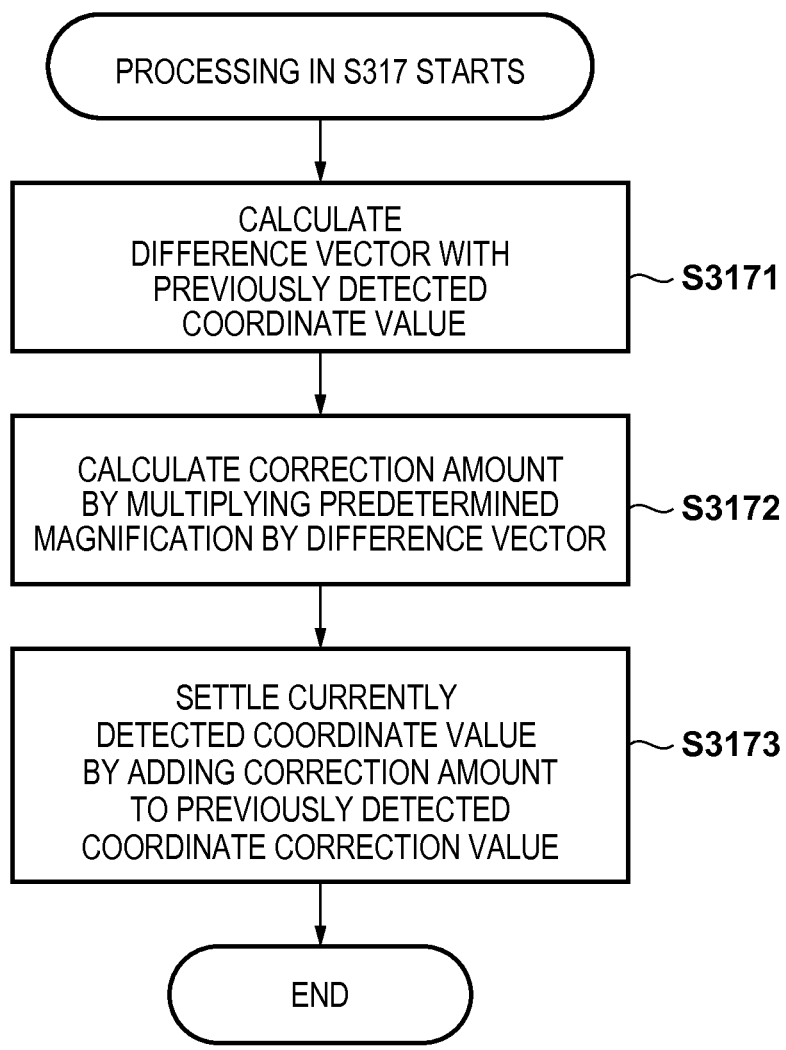

F I G. 8

| INSTRUCTION OPERATION STATE | COORDINATE SYSTEM OF COORDINATE INPUT APPARATUS UNIT: mm | | COORDINATE SYSTEM OF DISPLAY APPARATUS | |
|---|---|---|---|---|
| | POINT 1 | POINT 2 | POINT 1 | POINT 2 |
| COORDINATE VALUE OF FIG. 7A | (40, 30) | (60, 20) | (6666, 9999) | (9999, 6666) |
| COORDINATE VALUE OF FIG. 7B | (0, 50) | (100, 0) | (FFFF, 0000) | (0000, FFFF) |
| COORDINATE VALUE OF FIG. 7C | (800, 600) | (1200, 400) | (6666, 9999) | (9999, 6666) |
| COORDINATE VALUE OF FIG. 7D | (0, 1000) | (2000, 0) | (FFFF, 0000) | (0000, FFFF) |

PROCESSING APPARATUS, COMMAND GENERATION METHOD AND STORAGE MEDIUM

BACKGROUND OF THE INVENTION

Field of the Invention

The present invention relates to a processing apparatus for performing a process for generating a command, a method of generating a command and a storage medium.

Description of the Related Art

As a coordinate input apparatus (touch panel apparatus) that detects a touch position, there is a product that can detect not only one touch position but also multiple touch positions at substantially the same time. By overlapping this kind of touch panel apparatus over a display apparatus and integrating them like a smart phone, it is possible to realize an intuitive operation as if an object, and so on, displayed on a display screen is directly touched.

Japanese Patent Laid-Open No. 2007-279638 discloses a pinch operation that is an expansion/reduction operation by a multi-touch operation, where, after the positions of two points on a coordinate input area are touched, a displayed photograph or map is expanded and displayed when the touch positions of two points are moved to widen the interval between the touch positions, and it is reduced and displayed when the interval is narrowed.

However, in Japanese Patent Laid-Open No. 2007-279638, sufficient work cannot be performed by expansion/reduction by one pinch operation when a coordinate input area is large, and it is necessary to repeat a pinch operation many times.

Moreover, even in the overall gesture operation such as a flick operation, there is a case where an operation is complicated depending on the size of the coordinate input area.

SUMMARY OF THE INVENTION

The present invention provides a technique of reducing operation inconvenience caused by the difference of an input area size.

According to one aspect of the present invention, there is provided a processing apparatus for performing a process for generating a command in accordance with a touch input in a coordinate input area, comprising: an input unit configured to input data according to a coordinate of a touch input detected on a coordinate input area; and a generating unit configured to generate a command in accordance with a coordinate based on a size of the coordinate input area, wherein the generating unit is configured to generate, when a touch input on a first coordinate input area larger than a second coordinate input area is detected, a command corresponding to a coordinate of a first position on the first coordinate input area, wherein the first position is further from a second position on the first coordinate input area than a position of the touch input detected on the first coordinate input area, and the generating unit is configured to generate, when a touch input on the second coordinate input area smaller than the first coordinate input area is detected, a command corresponding to a coordinate of a position of the touch input detected on the second coordinate input area.

Further features of the present invention will become apparent from the following description of exemplary embodiments with reference to the attached drawings.

BRIEF DESCRIPTION OF THE DRAWINGS

FIGS. 1A to 1C are flowcharts illustrating the procedures of processing in a coordinate input system according to a first embodiment.

FIG. 2 is a flowchart illustrating the procedure of processing implemented by a coordinate input apparatus according to a second embodiment.

FIGS. 3A to 3B are flowcharts illustrating the procedures of processing implemented by a coordinate input apparatus according to a third embodiment.

FIG. 8 is an explanatory diagram that describes a coordinate transformation result according to one embodiment of the present invention.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(First Embodiment)

The first embodiment describes an example where, in a coordinate input system that can detect a touch position with respect to an input area, a command corresponding to a gesture operation based on the trajectory of the touch position is corrected by a parameter based on the size of a display area projected from a display apparatus to the input area.

Figure 9:
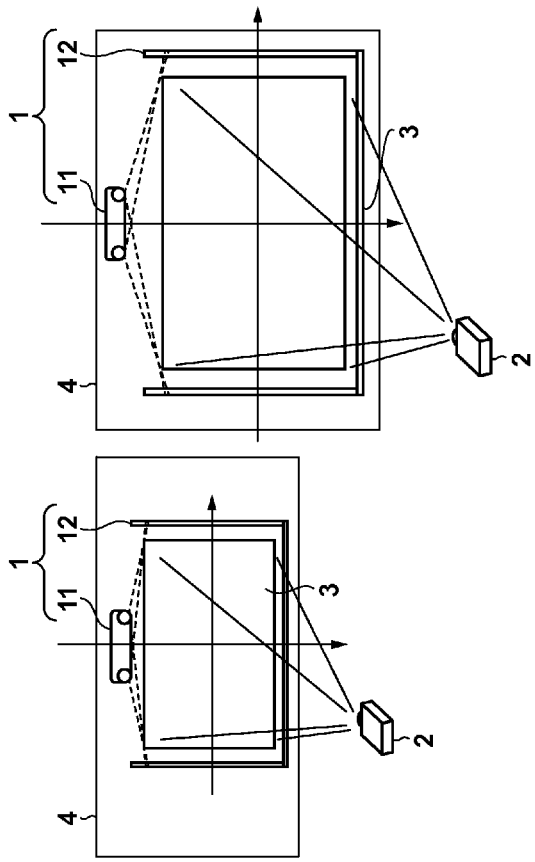
FIG. 9 is a diagram illustrating a configuration example of a coordinate input system according to one embodiment of the present invention.

First, a configuration example of a coordinate input system according to one embodiment of the present invention is described with reference to FIG. 9. The coordinate input system includes a coordinate input apparatus 1 that can detect a touch position with respect to an input area, and a display apparatus 2 that projects an image, and so on. The coordinate input apparatus 1 includes a control unit 11 and a retroreflection unit 12.

The control unit 11 and the retroreflection unit 12 are configured so as to be installed according to the size of a display area projected on a projection surface 4 by the display apparatus 2. The left of FIG. 9 denotes an example of a case where the size of the projection surface 4 is small, and the right of FIG. 9 denotes an example of a case where the size of the projection surface 4 is large.

The control unit 11 includes multiple sensor units including a light projection unit that projects an infrared light and a light receiving unit that receives an infrared light. The retroreflection unit 12 has a retroreflector surface that reflects an incident light to an incoming direction, and is installed in three peripheral surfaces of a coordinate input area 3 that covers a projection area of the display apparatus 2.

When an input instruction is given to the coordinate input area 3 by an instruction tool (for example, a dedicated input pen and a finger, and so on), an infrared light projected from the projection unit of the sensor unit is blocked and a reflected light by the retroreflector only in the input instruction direction is not acquired. The control unit 11 detects a light-shielding range of the part to which the input instruction is given, from the light quantity change of each sensor unit, specifies a detection point in the light-shielding range, calculates angle information on the detection point specified by each sensor unit and calculates the coordinates of the instruction position.

Unillustrated communication units are installed in the coordinate input apparatus 1 and the display apparatus 2 respectively, and information can be mutually transmitted by wired/wireless communication.

Figure 10:
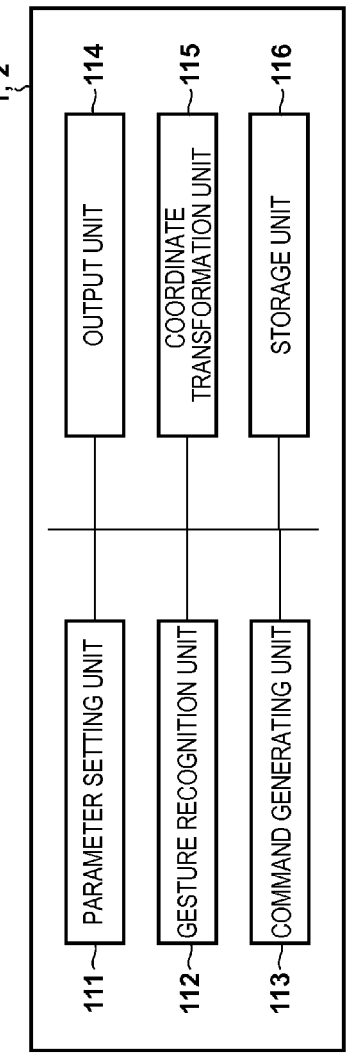
FIG. 10 is a diagram illustrating a functional configuration example of a control unit of a coordinate input apparatus according to one embodiment of the present invention.

Next, the functional configuration of the coordinate input apparatus 1 according to one embodiment of the present invention is described with reference to FIG. 10. The coordinate input apparatus 1 (control unit 11) includes a parameter setting unit 111, a gesture recognition unit 112, a command generating unit 113, an output unit 114, a coordinate transformation unit 115 and a storage unit 116.

The parameter setting unit 111 sets a parameter (for example, expansion/reduction magnification) on the basis of the size of the display area projected from the display apparatus 2 to the input area. Moreover, as described later, the parameter setting unit 111 calculates a parameter to transform the coordinate value detected in the coordinate input apparatus 1 into the coordinate value in the coordinate system of the display apparatus 2.

The gesture recognition unit 112 includes multiple sensor units and calculates a touch position on the basis of the angle information on the detection point detected and specified by each sensor unit. Moreover, the gesture recognition unit 112 recognizes a gesture operation (for example, expansion/reduction operation) on the basis of the trajectory of the calculated touch position. The command generating unit 113 generates a command corresponding to the gesture operation. The command here is, for example, an expansion command that expands a display area or a reduction command that reduces the display area.

The output unit 114 outputs the parameter set by the parameter setting unit 111 and the command generated by the command generating unit 113. It becomes possible to automatically adjust the command by the parameter corresponding to the size of the display area, and it is effective to improve user's operability. Moreover, the output unit 114 gives notice to an operator in order to urge the operator to perform operation for calibration described below.

Here, the configuration may be included in the display apparatus 2 or an unillustrated information processing apparatus that controls the display apparatus 2, instead of the coordinate input apparatus 1. Moreover, the control unit 11 of the coordinate input apparatus 1 may be configured so as to control the display apparatus 2. In the following explanation, an explanation is given using the same reference numerals even in a case where the display apparatus 2 or the information processing apparatus has these configurations.

Moreover, the output unit 114 transmits information on the size of the display area in the coordinate system of the coordinate input apparatus 1 to an external apparatus (for example, an information processing apparatus such as a personal computer that controls the display apparatus 2).

Figure 6A:
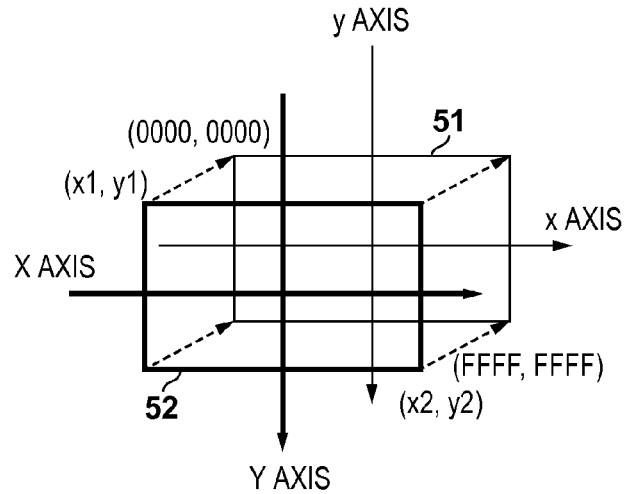
FIGS. 6A to 6B are explanatory diagrams of coordinate system transformation processing according to one embodiment of the present invention.
Figure 6B:
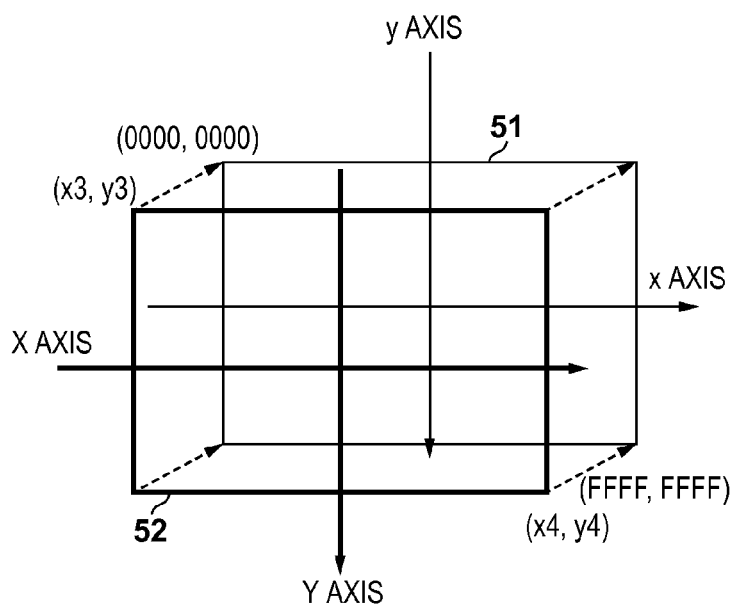

Next, a coordinate system 51 of the display apparatus 2 and a coordinate system 52 of the coordinate input apparatus 1 in a case where the display apparatus 2 and the coordinate input apparatus 1 are disposed in an overlapping manner are described with reference to FIGS. 6A and 6B. In FIGS. 6A and 6B, the coordinate system 51 of the display apparatus 2 is shown by a thin line and the coordinate system 52 of the coordinate input apparatus 1 is shown by a bold line.

In FIG. 6A, the coordinate system 51 of the display apparatus 2 is defined by the x axis and the y axis, where the coordinates of the upper left part of the display apparatus 2 is defined as origin (0000, 0000) and the coordinates of the lower right part is defined as (FFFF, FFFF). On the other hand, for example, the coordinate input effective area of the coordinate input apparatus 1 is normally defined in units of mm, using the upper left corner part of the coordinate input effective area as origin (0, 0). Further, the coordinate system 52 of the coordinate input apparatus 1 is transformed into the coordinate system 51 of the display apparatus 2 by the coordinate input apparatus 1 itself or control equipment such as a personal computer connected with the display apparatus 2.

In the transformation method, if the coordinate value detected by the coordinate input apparatus 1 is (x1, y1) when the upper left part of the display apparatus 2 is touched, it is transformed into coordinate value (0000, 0000) in the display coordinate system. Similarly, if the coordinate value detected by the coordinate input apparatus is (x2, y2) when the lower right part of the display apparatus 2 is touched, it is transformed into coordinate value (FFFF, FFFF) in the display coordinate system. Thus, for example, by displaying a cursor or the like on a known position in the display coordinate system in the display area, touching the position, calculating the coordinate value calculated by the coordinate input apparatus 1 and associating both of them with each other, it is possible to set a parameter to transform the coordinate system.

A parameter setting procedure for such coordinate transformation is called calibration. By implementing the calibration beforehand, when an arbitrary position is touched, it becomes possible to display the cursor in the position.

FIG. 6B illustrates an example in a case where the display area is larger than the case of FIG. 6A, and the coordinate system 51 of the display apparatus 2 and the coordinate system 52 of the coordinate input apparatus 1 are illustrated in a similar manner. Even in a case where the display area becomes larger, similar to the case of FIG. 6A, it is usual that the coordinate system 51 of the display apparatus 2 is defined by coordinates (0000, 0000) and coordinates (FFFF, FFFF).

Meanwhile, the coordinate system 52 of the coordinate input apparatus 1 output in units of mm is defined by (x3, y3) and (x4, y4), and has a larger value as the display area becomes larger. However, when it is transformed in the display coordinate system, the coordinate system in FIG. 6A and the coordinate system in FIG. 6B have the same value.

As for this transformation work, it is general that processing is performed in the coordinate input apparatus 1 and the result is output to a personal computer, and so on, by the display coordinate system. Alternatively, a configuration may be adopted such that the coordinate input apparatus 1 outputs the coordinate value in the coordinate system 52 of the coordinate input apparatus 1 as it is and it is subjected to coordinate transformation by a driver or application software installed in a personal computer, and so on.

Next, one example of a multi-touch operation to detect the movement of two or more points at the time of being simultaneously touched and control a screen and a problem of the multi-touch operation are described with reference to FIGS. 7A to 7D.

Figure 7A:
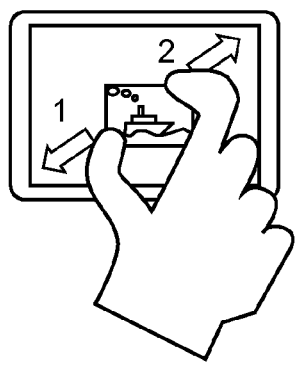
FIGS. 7A to 7D are explanatory diagrams of one example of a multi-touch operation according to one embodiment of the present invention.
Figure 7C:
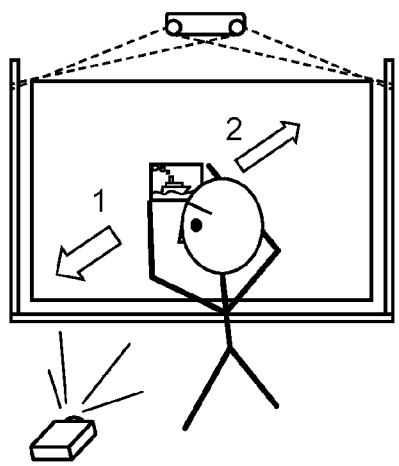
Figure 7B:
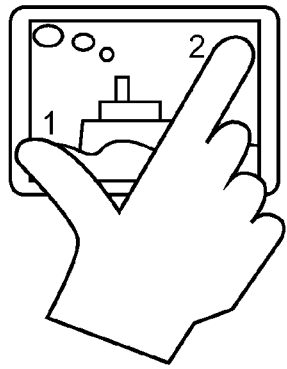

FIGS. 7A and 7B illustrate an operation example in relatively small portable equipment such as a smart phone. As illustrated in FIGS. 7A and 7B, if the size of the display area is assumed to be 50 mm in the vertical direction and 100 mm in the horizontal direction, it is a size in which two points in the diagonal direction of the screen can be touched when the thumb and the forefinger are spread as illustrated in FIG. 7B.

In a case where a currently displayed photograph is expanded by the multi-touch operation, after two points are touched in the state of FIG. 7A, the touch positions are moved to the touch positions in the state of FIG. 7B while they are touched. Further, the photograph is expanded in proportion to the movement amount, and it enters a state where the photograph is expanded to the entire display screen as illustrated in FIG. 7B.

Figure 7D:
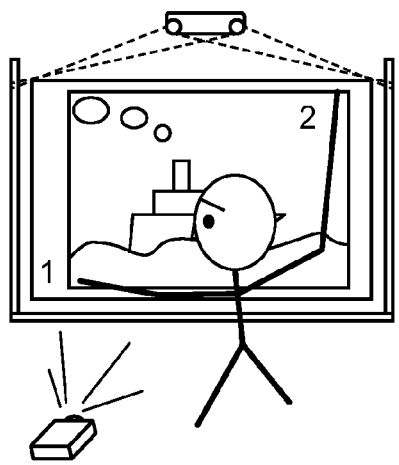

Meanwhile, FIGS. 7C and 7D illustrate a case where a big screen projected by a display apparatus (projector) is assumed, and the size of a display area is assumed to be 1000 mm in the vertical direction and 2000 mm in the horizontal direction. In such a case, to expand a photograph as illustrated in FIG. 7C to the full screen, an operator has to open both hands and perform an operation as illustrated in FIG. 7D.

This is because a result of transforming the coordinate value detected by the coordinate input apparatus into that of the display coordinate system and outputting it is the same as the state of FIG. 7B and the state of FIG. 7D regardless of the movement quantity of a touch operation by the operator as illustrated in FIG. 8.

Therefore, when the photograph is expanded in the big screen from the state of FIG. 7C to the state of FIG. 7D by a pinch operation by one hand like a change from the state of FIG. 7A to that of FIG. 7B, the pinch operation has to be repeated many times. In other words, an expansion amount cannot be sufficiently acquired by one pinch operation, and it is assumed that the pinch operation is repeated and an operation to expand the photograph is gradually performed, which is complicated work.

Processing of the present embodiment without such complicated work is described below in detail.

[Calibration Processing]

Figure 1A:
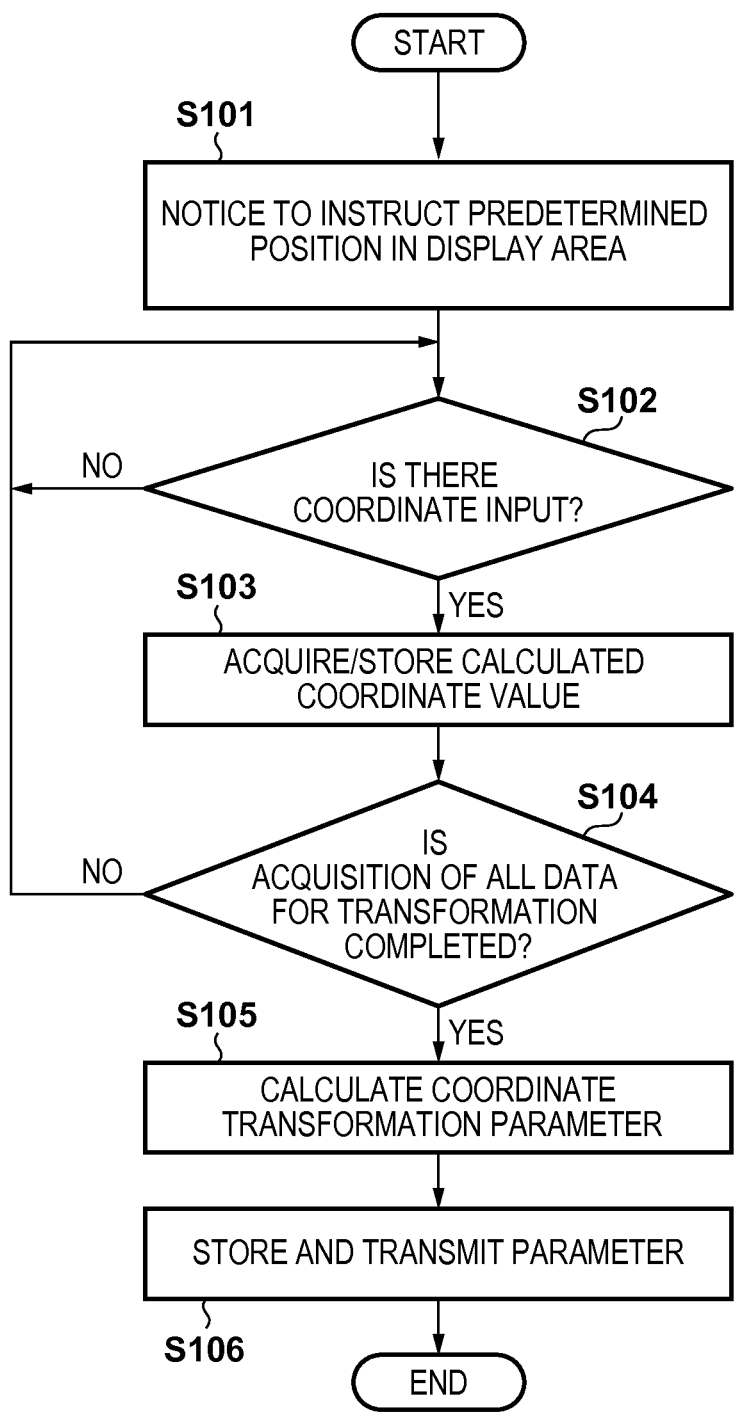

FIG. 1A is a flowchart illustrating the procedure of calibration processing to transform the coordinate system of the coordinate input apparatus 1 into the coordinate system of the display apparatus 2.

In S101, the control unit 11 gives notice to an operator in order to urge the operator to perform operation that sequentially instructs one or more predetermined positions of the display area (for example, four corners of the display area). The notice can be performed in various methods such as display, sound and light including an LED, and so on. Here, the display area projected on the projection surface 4 by the display apparatus 2 in the figure is formed so as to be included in the coordinate input area 3, and, in a case where four corners of the display area are instructed, the coordinate input apparatus 1 is formed so as to be able to detect the four instruction positions.

In S102, the control unit 11 determines whether a coordinate input is detected as a result of instruction operation. In a case where the coordinate input is detected (S102; Yes), it proceeds to S103. On the other hand, in a case where the coordinate input is not detected (S102; No), it waits until it is detected.

In S103, the control unit 11 stores a detected coordinate value and position information in the display coordinate system of the display apparatus 2 corresponding to the coordinate value, in the storage unit 116. In the following, the coordinate system of the coordinate input apparatus 1 is written as digi(x, y), and the coordinate system of the display apparatus 2 is written as disp(X, Y).

Here, calibration to touch four corners of the display area is repeated four times, but a calibration method is not limited to this. For example, by giving an instruction to the display apparatus 2 by application software, and so on, a cursor may be displayed on a known position in the display area of the display coordinate system so as to urge the operator to touch the position. Further, instruction coordinates in the coordinate system of the coordinate input apparatus 1, which are acquired by performing instruction operation, and the known position in the display area may be associated, and the information may be stored in S103.

In S104, the control unit 11 determines whether all data required to calculate a parameter for coordinate transformation is acquired. In a case where it is determined that all data is acquired (S104; Yes), it proceeds to S105. On the other hand, in a case where it is determined that all data is not acquired (S104; No), it returns to S102.

In S105, the control unit 11 calculates a parameter to transform the coordinate value detected by the coordinate input apparatus 1 into the coordinate value in the coordinate system of the display apparatus 2 on the basis of the information acquired in S103. Here, as described with reference to FIGS. 6A to 6B, the coordinate system of the coordinate input apparatus 1 is normally units of mm, and, by implementing calibration to touch four corners, it becomes possible to understand the size of the display area. Meanwhile, when it is transformed in the display coordinate system, the display area is vertically and horizontally divided into about 65000 (hexadecimal FFFF is transformed into a decimal value: 65535) and a position is merely decided, and information on the absolute size lacks.

Therefore, in S106, the parameter used for an operation of coordinate transformation is stored in the storage unit 116, and information on the size of the display area acquired in coordinate system digi(x, y) of the coordinate input apparatus 1 is transmitted to an external apparatus (for example, an information processing apparatus such as a personal computer that controls the display apparatus 2). By this means, each processing of the flowchart in FIG. 1A ends.

[Coordinate Detection Processing]

Figure 1B:
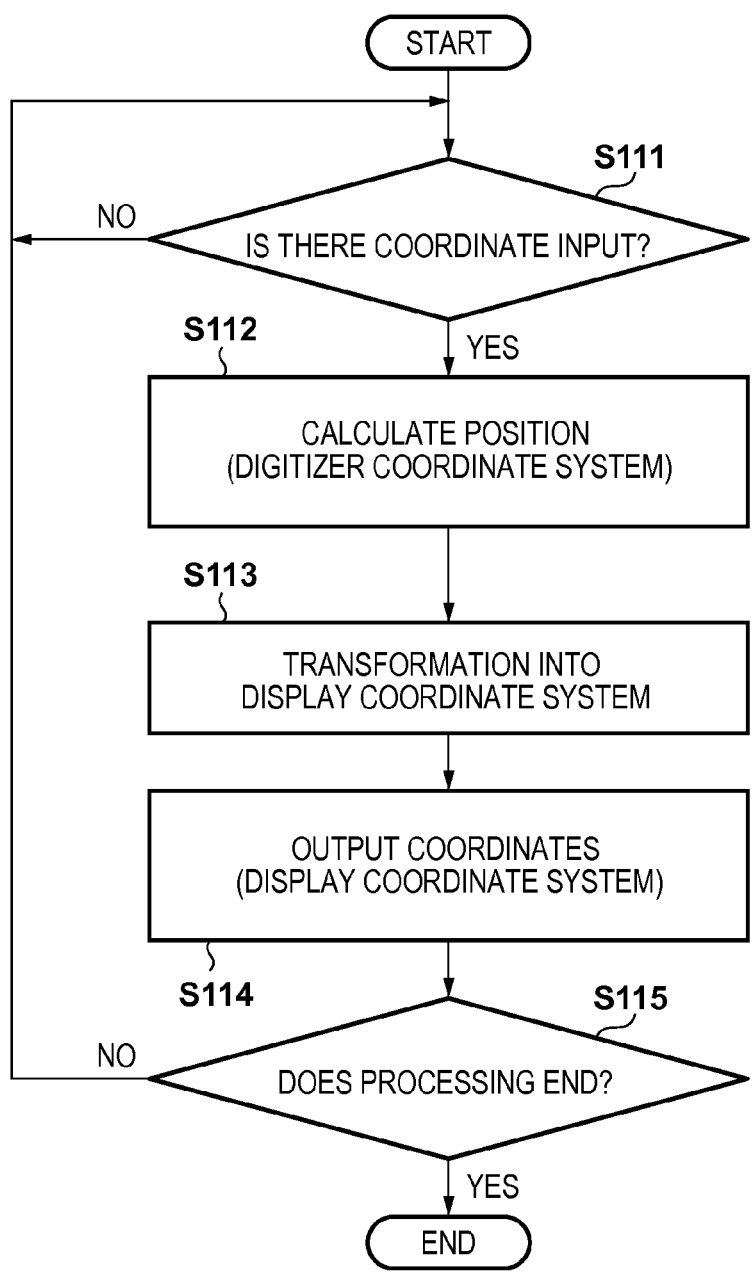

FIG. 1B is a flowchart illustrating the procedure of coordinate detection processing of the coordinate input apparatus 1, which is followed after the completion of calibration processing.

In S111, the control unit 11 determines whether a coordinate input by a touch operation is detected. In a case where the coordinate input is detected (S111; Yes), it proceeds to S112. On the other hand, in a case where the coordinate input is not detected (S111; No), it waits until it is detected.

In S112, the control unit 11 calculates coordinate value digi(x, y) of the touch position in the coordinate system of the coordinate input apparatus 1. In S113, the coordinate transformation unit 115 of the control unit 11 transforms coordinate value digi(x, y) calculated in S112 into coordinate value disp(X, Y) in the display coordinate system of the display apparatus 2 by the use of the coordinate transformation parameter stored by the processing in S106.

In S114, the output unit 114 of the control unit 11 outputs transformed coordinate value disp(X, Y) to an external apparatus (for example, a personal computer, and so on).

In S115, the control unit 11 determines whether to end processing. For example, the end of processing may be determined by the power-off of the coordinate input apparatus 1 or the display apparatus 2, or a change to a state where the coordinate input is not detected. In a case where it is determined that the processing is ended (S115; Yes), each processing of the flowchart in FIG. 1B ends. On the other hand, in a case where it is determined that the processing is not ended (S115; No), it returns to S111 to repeat a series of processing. Here, it is assumed that the coordinate input apparatus 1 can detect at least two coordinate values at the same time.

[Processing of Coordinate Value]

FIG. 1C is a flowchart illustrating the procedure for processing a coordinate value output by the coordinate input apparatus 1 in an information processing apparatus (for example, personal computer) that controls display of the display apparatus 2. Here, the display apparatus 2 may be formed so as to be integrated with the information processing apparatus, and, in that case, it is assumed that the function of the information processing apparatus is included in the display apparatus 2. Moreover, the control unit 11 of the coordinate input apparatus 1 may execute this procedure.

In S121, the information processing apparatus determines whether coordinate value disp(X, Y) output from the coordinate input apparatus 1 in the display coordinate system is acquired. In a case where it is determined that coordinate value disp(X, Y) is acquired (S121; Yes), it proceeds to S122. On the other hand, in a case where it is determined that coordinate value disp(X, Y) is not acquired (S121; No), it waits until it is acquired.

In S122, the information processing apparatus analyzes the trajectory of the coordinate value repeatedly output from the coordinate input apparatus 1. In S123, the gesture recognition unit 112 of the information processing apparatus determines whether a gesture operation (for example, an expansion operation as illustrated in FIGS. 7A to 7D) corresponding to the analyzed trajectory can be recognized. In a case where the gesture operation can be recognized (S123; Yes), it proceeds to S124. On the other hand, in a case where the gesture operation cannot be recognized (S123; No), it proceeds to S126.

In S124, the command generating unit 113 of the information processing apparatus generates a command corresponding to the gesture operation recognized in S123. For example, in a case where trajectory information that intends an expansion operation is acquired, an expansion command to expand a currently displayed object is generated.

In S125, the parameter setting unit 111 of the information processing apparatus sets a parameter for the command generated in S124. The information processing apparatus has already acquired information on the size of a display area acquired in coordinate system digi(x, y) output in S106 in the coordinate input apparatus 1. Therefore, as the command parameter, the expansion ratio with respect to the movement amount of a touch position according to the size of the display area is automatically set here.

For example, it is assumed that, when the distance between two instructed points is expanded from 5 cm to 10 cm in a display area of a certain size and an expansion command is generated, the size of a display area of an active object becomes two times (the area is $2^2$ times). In a larger display area, when the distance between two instructed points is expanded from 5 cm to 10 cm and the expansion command is generated in the same way, setting is performed such that the size of the display area of the active object becomes three times (the area is $3^2$ times).

That is, regardless of the fact that an operator performs a similar operation, the size of the object expanded as a result becomes a different result according to the size of the display area.

As described with reference to FIGS. 7A to 7D, in a case where a photograph (FIG. 7A) displayed in a small display apparatus is expanded to the full screen (FIG. 7B), it can be realized by a pinch operation. On the other hand, a photograph of the same size as in FIG. 7A is displayed (FIG. 7C) in a large display apparatus, and, to expand it to the full screen in the same way, complicated operation is required until the photograph becomes a desired size (FIG. 7D). It is because it is not possible to achieve a desired size in a larger display apparatus even if a man opens hands to the maximum, and this operation has to be repeated.

The present embodiment automatically sets a command parameter (for example, the expansion ratio of the expansion command or the reduction ratio of the reduction command) according to the size of display screen in order to prevent a decrease in this operability and provide a better operation environment.

In S126, the output unit 114 of the information processing apparatus outputs the command generated in S124 and the command parameter set according to the size of the display screen in S125 to operating application software, and so on. In S127, the output unit 114 of the information processing apparatus outputs coordinate value disp(X, Y) to the operating application software, and so on.

In S128, the information processing apparatus determines whether to end processing. For example, the end of processing may be determined by the power-off of the coordinate input apparatus 1, the display apparatus 2 or the information processing apparatus, and so on. In a case where it is determined that the processing is ended (S128; Yes), each processing of the flowchart in FIG. 1C ends. On the other hand, in a case where it is determined that the processing is not ended (S128; No), it returns to S121 to repeat a series of processing.

As described above, in the first embodiment, information on the size of a display area acquired in coordinate system digi(x, y) of the coordinate input apparatus 1 is output to an external apparatus (for example, an information processing apparatus such as a personal computer that controls the display apparatus 2), and coordinate value disp(X, Y) in the display coordinate system is output. Further, the information processing apparatus having acquired coordinate value disp (X, Y) in the display coordinate system performs processing such as command generation.

That is, in the first embodiment, coordinate value disp(X, Y) output by the coordinate input apparatus 1 in the display coordinate system is processed in a personal computer of the output destination, a gesture operation is analyzed and a command parameter corresponding to the gesture operation is automatically set. Here, the coordinate input apparatus 1 may set the command parameter corresponding to the gesture operation on the basis of information on the display area size.

By this means, the expansion ratio of a display object with respect to the movement amount of a multi-touch operation is automatically adjusted according to the size of the display screen, and, for example, an object is expanded more by a small pinch operation in a large screen. As a result, it is possible to reduce operation inconvenience caused by the difference of an input area size.

Here, the automatic setting of a command parameter according to an expansion operation has been described, but it is not limited to this, and it is applicable to any gesture operation such as a reduction operation and a flick operation.

(Second Embodiment)

In the second embodiment, an example where a coordinate input apparatus itself automatically performs command generation and command parameter setting is described.

The procedure of calibration processing to transform the coordinate system of the coordinate input apparatus 1 in this example into the coordinate system of the display apparatus 2 is the same as FIG. 1A, except for the processing in S106. In this example, the control unit 11 stores the coordinate transformation parameter calculated in S105 in S106, but information on the size of a display area is not output to an external apparatus (for example, an information processing apparatus such as a personal computer that controls the display apparatus 2). Here, the configuration of the coordinate input apparatus 1 is similar to the first embodiment.

FIG. 2 is a flowchart illustrating the procedures of coordinate detection processing of the coordinate input apparatus 1 and automatic setting processing of a command parameter by the coordinate input apparatus 1 itself, which is followed after the completion of calibration processing. S211 and S212 and S111 and S112 are similar processing, S213 to S217 and S122 to S126 are similar processing, and S218 to S220 and S113 to S115 are similar processing, except for that the processing subject is the coordinate input apparatus 1. To be more specific, the coordinate input apparatus 1 itself automatically sets a command parameter in S216 on the basis of information on a display area size stored in S206.

In such a series of processing, information output by the coordinate input apparatus 1 is only instruction coordinate disp(X, Y) in the display coordinate system and a command that reflects the value of a command parameter such as expansion. Therefore, the information can be received in a basic function included in the OS of a personal computer, and there is an advantage that it does not have to install a dedicated driver, and so on.

(Third Embodiment)

Recently, as an OS standard function of an information processing apparatus (personal computer), not only a touch gesture function that analyzes a series of trajectories of an instruction coordinate value and generates a command but also a multi-touch gesture function that analyzes the trajectories of multiple touch positions respectively and generates a command are mounted more. In the third embodiment, an example where a coordinate input apparatus operates as if it is automatically set according to, for example, the size of a display area of a command parameter of an expansion gesture command by the use of the multi-touch gesture function is described.

First, since calibration processing is similar to the second embodiment, the explanation is omitted.

Figure 3A:
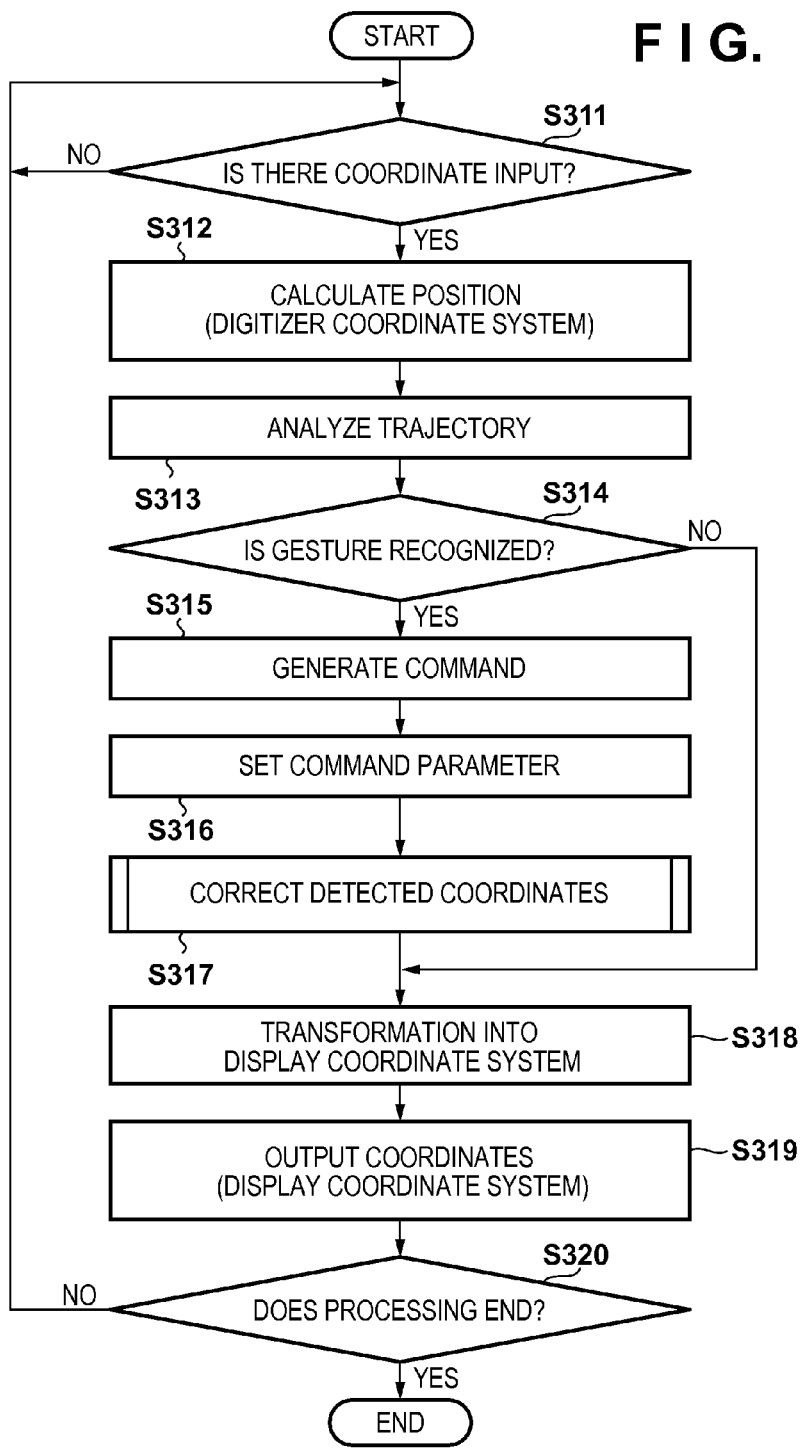

FIG. 3A is a flowchart illustrating the procedures of coordinate detection processing of the coordinate input apparatus 1 and automatic setting processing of a command parameter by the coordinate input apparatus 1 itself, which is followed after the completion of calibration processing.

Each processing in S311 to S316 is similar to each processing in S211 to S216 in FIG. 2. In S317, the control unit 11 of the coordinate input apparatus corrects a detected coordinate value.

Here, FIG. 3B is a flowchart illustrating a detailed procedure of detection coordinate correction processing in S317. In S3171, the control unit 11 calculates a difference vector between previously detected coordinate value digi (Xn-1, Yn-1) in the coordinate system of the coordinate input apparatus and currently detected coordinate value digi(Xn, Yn). Here, n is an integer.

In S3172, the control unit 11 calculates a correction amount by multiplying the difference vector calculated in S3171 by magnification automatically set on the basis of the display area size stored by the processing in S106 of FIG. 1.

In S3173, the control unit 11 calculates currently detected coordinate correction value M_disp(Xn, Yn) by adding the correction amount calculated in S3172 to previously detected coordinate correction value M_disp(Xn-1, Yn-1). That is, in a case where correction processing with respect to the previously detected coordinate instruction position is performed, a result of adding a correction amount calculated based on the currently detected coordinate instruction position and a coordinate correction value that corrects the previously detected coordinate correction position is assumed to be a coordinate correction value that corrects the currently detected coordinate instruction position. By this means, the processing in FIG. 3B ends.

It returns to FIG. 3A again. In S318, coordinate correction value M_disp(Xn, Yn) currently detected in S317 is transformed into the display coordinate system. Further, in S319, it is output to external equipment such as a personal computer. Here, the value of coordinate value M_disp(X0, Y0) that is output first as a coordinate value corrected by the gesture recognition in S314 is value digi(X, Y) in the coordinate system of the coordinate input apparatus 1, which is detected immediately before the gesture recognition in S304. The processing in S320 is similar to the processing in S220.

Figure 4A:
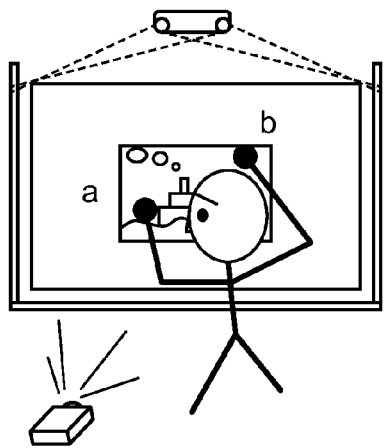
FIGS. 4A to 4D are explanatory diagrams of processing according to one embodiment of the present invention.

The effect of the present embodiment is described with reference to FIGS. 4A and 4B. FIG. 4A indicates a moment at which an operator touches point "a" and point "b" in a photograph display area in order to expand an object (photograph). The coordinate input apparatus 1 detects coordinates in S311 and calculates touch position coordinates digi(X, Y) in S312.

In the trajectory analysis processing in S313, since the current state is that the coordinates are only detected momentarily, the analysis of the trajectory is not performed and a state where a gesture operation is performed cannot be recognized even in S314. Therefore, the currently detected coordinates are transformed into coordinate value disp(X, Y) in the display coordinate system by the use of a coordinate transformation parameter in S318, and the coordinate value is output to external equipment such as a personal computer in S319. Further, it returns to S311.

Figure 4B:
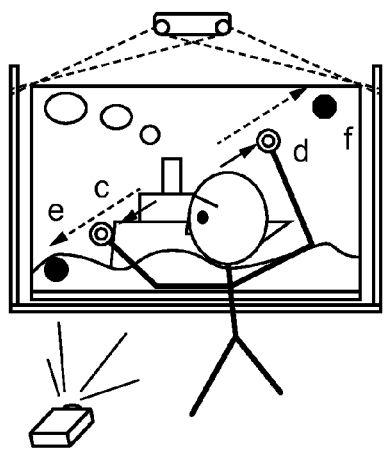

Afterward, since coordinate detection processing is continuously performed when operation is performed from the state of FIG. 4A to the state of FIG. 4B, touch position coordinate digi(X, Y) is detected in S312 and the trajectory analysis of respective coordinates is performed in S313. As a result of the trajectory analysis, when it is determined that the distance between two points is in an expanded state, it is determined that an expansion operation is performed in S314, and an expansion command is generated in S315. Here, since it is the timing at which the gesture operation is recognized for the first time and correction processing is performed on the coordinate value first, previously measured coordinate value digi(X, Y) is set as previous correction coordinates M_disp(X0, Y0) to which the correction amount is added in S3173. As illustrated in FIG. 4B, the currently detected coordinate value is the coordinate values of instruction position c and instruction position d.

Each instruction position has changed from the previously detected instruction position in FIG. 4A to FIG. 4B. Therefore, first, a difference vector between the previous coordinate instruction position and the current coordinate instruction position is calculated in S3171, and a correction amount is calculated by multiplying a predetermined magnification by the calculated difference vector in S3172. Further, by adding the correction amount to correction coordinate value M_disp(X0, Y0) set by the previous coordinate detection in S3173, current correction coordinate value M_disp(X1, Y1) is calculated.

Since a display screen is large in this example, it is preferable to perform expansion by less operation. Therefore, in the same direction as an actual movement direction, a correction coordinate value in which the movement amount is expanded is automatically calculated according to the size of the display apparatus 2. As a result, the corrected coordinate value becomes coordinates in the positions of point e and point f in FIG. 4B.

This value is transformed into the display coordinate system in S318 and output in S319. For example, a personal computer having received this information performs operation so as to expand the photograph with a larger effect than the actual movement amount.

(Fourth Embodiment)

The third embodiment has described an example where a coefficient based on a difference vector between a detected coordinate value and the previous coordinate value and the size of a display area is multiplied by the difference vector and added, coordinates are output and thereby the magnification in an expansion operation is set according to the size of the display screen. The fourth embodiment describes an example where coordinates are output so as to be able to set an appropriate reduction ratio according to the size of a display area in the same way.

Figure 4C:
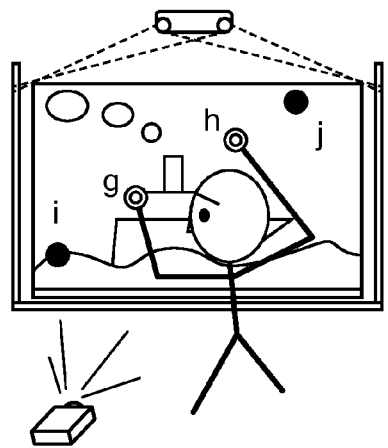
Figure 4D:
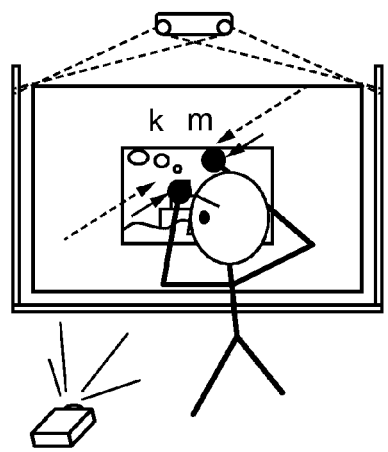

FIGS. 4C and 4D schematically illustrate a position touched by an operator and a coordinate position output by the coordinate input apparatus 1 such that an OS can determine that a large reduction operation by less operation is realized.

FIG. 4C illustrates that points g and h are points touched by the operator, and touch positions which are detected by the coordinate input apparatus 1 and output in the display coordinate system at that time are point i and point j respectively. In the case of the present embodiment, point i and point j exist in the straight line connecting points g and h, and points i and j are set outside the space between two points according to the distance between two points of points g and h and the size of the display area.

Afterward, when an operation is performed as illustrated in FIG. 4D by a reduction operation, a larger movement amount than an actual operation amount is output according to a reduction ratio corresponding to the size of the display area. FIG. 4D illustrates a state where a corrected coordinate value which is actually output and an actual coordinate value are matched.

Thus, a corrected reference coordinate value which is set first and output is different between the case of the expansion operation described in FIGS. 4A and 4B and the case of the reduction operation described in FIGS. 4C and 4D.

Figure 5:
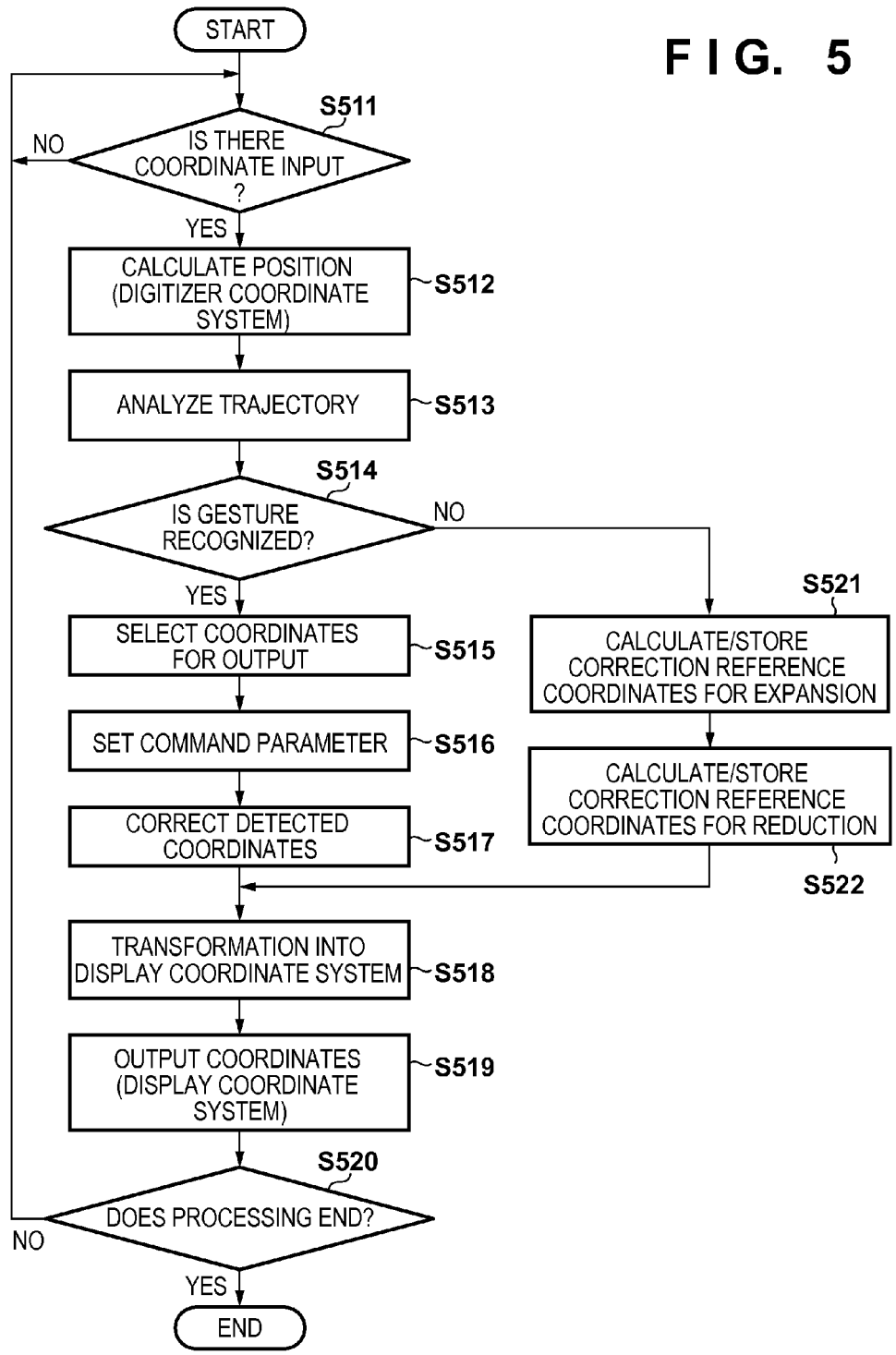
FIG. 5 is a flowchart illustrating the procedure of processing implemented by a coordinate input apparatus according to a fourth embodiment.

FIG. 5 is a flowchart illustrating the processing procedure of an expansion/reduction operation according to the fourth embodiment. Each processing in S511 to S514 is similar to each processing in S311 to S314, and each processing in S516 to S520 is similar to each processing in S316 to S320.

In FIG. 5, candidate coordinates as reference coordinates are calculated and stored in S521 and S522. In S521, correction reference coordinates for an expansion operation are calculated and stored. In S522, correction reference coordinates for a reduction operation are calculated and stored. Points i and j in FIG. 4C are the correction reference coordinates for the reduction operation. The correction reference coordinates for expansion are set between points g and h though it is not illustrated. Further, in S515, any reference coordinates stored beforehand in S521 or S522 are selected on the basis of the result of gesture recognition in S514 and processed as coordinates for output.

[Modification Example]

In a modification example, the following processing is further performed in addition to each embodiment mentioned above. That is, in a case where the size of a display area is equal to or greater than a predetermined size and the distance between two points (absolute distance) in the coordinate system of the coordinate input apparatus 1 is equal to or greater than a predetermined distance, correction by a parameter (expansion/reduction ratio) based on the size of the display area is prohibited. Further, in a case where the size of the display area is equal to or greater than the predetermined size and the distance between two points (absolute distance) in the coordinate system of the coordinate input apparatus 1 is less than the predetermined distance, correction by the parameter (expansion/reduction ratio) based on the size of the display area is permitted. Moreover, in a case where the size of the display area is less than the predetermined size, correction by the parameter (expansion/reduction ratio) based on the size of the display area is prohibited.

Moreover, it may be configured such that a mode with correction by the parameter and a mode without correction are prepared and the user can change them by pressing a switching switch.

Thus, by correcting an output coordinate value by a parameter in a case where a predetermined condition is satisfied, it becomes possible to facilitate an operation with respect to a large screen.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-097111, filed May 8, 2014, which is hereby incorporated by reference herein in its entirety.

What is claimed is:

1. A processing apparatus, comprising:
one or more processors; and
a memory having stored thereon instructions which, when executed by the one or more processors, cause the processing apparatus to:
 detect movement of a touch position of a touch operation performed on an input area;
 determine, based on both a detected amount of movement of the touch position and a size of a display area for displaying an image, an amount of change of an image size to be changed in response to the detected movement of the touch position, so that the amount of change of the image size determined in a first case, where the size of the display area is a first size, is larger than the amount of change of the image size determined in a second case where the size of the display area is a second size that is smaller than the first size, wherein the detected amount of movement of the touch position in the first case is the same as the detected amount of movement of the touch position in the second case, and wherein the display area is an area positioned in the input area and the size of the display area is resizable; and
 perform control for changing a size of an image displayed in the display area according to the determined amount of change of the image size.

2. The processing apparatus according to claim 1, wherein the amount of change of the image size is determined by transforming a value of the amount of movement in a first coordinate system corresponding to the input area into a value in a second coordinate system corresponding to the display area.

3. The processing apparatus according to claim 1, wherein, an enlargement magnification of an image displayed in the display area is determined as the amount of change of the image size.

4. The processing apparatus according to claim 1, wherein, a reduction magnification of an image displayed in the display area is determined as the amount of change of the image size.

5. The processing apparatus according to claim 1, wherein the instructions, when executed by the one or more processors, further cause the processing apparatus to decide the size of the display area based on a touch position of a touch operation for indicating the display area in the input area where an image is displayed,
 wherein the amount of change of the image size is determined based on both the decided size of the display area and the amount of movement detected in response to a touch operation performed after the touch operation for indicating the display area.

6. The processing apparatus according to claim 1, wherein the detected amount of movement of the touch position in the first case and the detected amount of movement of the touch position in the second case are the same values which are smaller than a threshold value, and
 wherein the amount of change of the image size determined in a third case, where the size of the display area is a third size, is the same as the amount of change of the image size determined in a fourth case where the size of the display area is a fourth size that is smaller than the third size, wherein the detected amount of movement of the touch position in the third case and the detected amount of movement of the touch position in the fourth case are the same values which are larger than the threshold value.

7. The processing apparatus according to claim 1, wherein the instructions, when executed by the one or more processors, further cause the processing apparatus to:
 project light into the input area; and
 receive the projected light,
 wherein movement of the touch position of the touch operation is detected based on a light receiving state in the receiving.

8. The processing apparatus according to claim 1, wherein movement of the touch position of the touch operation is detected by obtaining information representing the touch position from a coordinate input apparatus.

9. The processing apparatus according to claim 1, wherein the display area is an area where an image is to be projected by a display apparatus.

10. A processing method, comprising:
 detecting movement of a touch position of a touch operation performed on an input area;
 determining, based on both an amount of movement of the touch position detected in the detecting and a size of a display area for displaying an image, an amount of change of an image size to be changed in response to the movement of the touch position detected in the detecting, so that the amount of change of the image size determined in a first case, where the size of the display area is a first size, is larger than the amount of change of the image size determined in a second case where the size of the display area is a second size that is smaller than the first size, wherein the amount of movement of the touch position detected in the detecting in the first case is the same as the amount of movement of the touch position detected in the detecting in the second case, and wherein the display area is an area positioned in the input area and the size of the display area is resizable; and
 performing control for changing a size of an image displayed in the display area according to the amount of change of the image size determined in the determining.

11. A non-transitory storage medium for storing a computer program for performing a processing method, the method comprising:
 detecting movement of a touch position of a touch operation performed on an input area;
 determining, based on both an amount of movement of the touch position detected in the detecting and a size of a display area for displaying an image, an amount of change of an image size to be changed in response to the movement of the touch position detected in the detecting, so that the amount of change of the image size determined in a first case, where the size of the display area is a first size, is larger than the amount of change of the image size determined in a second case where the size of the display area is a second size that is smaller than the first size, wherein the amount of movement of the touch position detected in the detecting in the first case is the same as the amount of movement of the touch position detected in the detecting in the second case, and wherein the display area is an area positioned in the input area and the size of the display area is resizable; and performing control for changing a size of an image displayed in the display area according to the amount of change of the image size determined in the determining.

\* \* \* \* \*